United States Patent
Gonin

(10) Patent No.: US 8,267,446 B2
(45) Date of Patent: Sep. 18, 2012

(54) MOTOR VEHICLE FRONT-END PANEL ASSEMBLY COMPRISING A SHIELD

(75) Inventor: Vincent Gonin, Sochaux (FR)

(73) Assignee: Faurecia Bloc Avant, Nanterre (FR)

( * ) Notice: Subject to any disclaimer, the term of this patent is extended or adjusted under 35 U.S.C. 154(b) by 0 days.

(21) Appl. No.: 12/624,673

(22) Filed: Nov. 24, 2009

(65) Prior Publication Data

US 2010/0127533 A1 May 27, 2010

(30) Foreign Application Priority Data

Nov. 24, 2008 (FR) ..................................... 08 57945

(51) Int. Cl.
*B60R 19/30* (2006.01)

(52) U.S. Cl. ... 293/136; 293/120; 293/133; 296/187.03; 296/187.09

(58) Field of Classification Search .................. 293/109, 293/110, 115, 136, 180, 132, 133, 120, 146; 296/35.2, 136.08, 187.01, 187.03, 190.3, 296/193.09, 93, 181.2, 187.09, 193.1, 203.01, 296/203.02, 901.01; 280/770; 188/371, 188/377

See application file for complete search history.

(56) References Cited

U.S. PATENT DOCUMENTS

| 3,926,463 A * | 12/1975 | Landwehr et al. ............ 293/136 |
| 5,799,991 A * | 9/1998 | Glance .......................... 293/121 |
| 2003/0057719 A1* | 3/2003 | Yamagiwa .................... 293/110 |

FOREIGN PATENT DOCUMENTS

| DE | 100 02 499 Al | 3/2001 |
| WO | WO 2008/061917 A1 | 5/2008 |
| WO | WO 2008087346 A2 * | 7/2008 |
| WO | WO 2008/107599 A1 | 9/2008 |
| WO | WO 2008/110708 A1 | 9/2008 |
| WO | WO 2008110709 A2 * | 9/2008 |

OTHER PUBLICATIONS

French Search Report, dated Mar. 26, 2009, in corresponding French application.

* cited by examiner

*Primary Examiner* — Dennis Pedder
*Assistant Examiner* — Jason S Daniels
(74) *Attorney, Agent, or Firm* — Young & Thompson

(57) ABSTRACT

This assembly includes a plastics material structural frame (2) including at least a lower cross member (8) and vertical struts (10, 12), each of said struts (10, 12) forming, over at least a portion of its height, a deformable energy absorption component (14), the module further including a plastics material shield (4) formed so as to match the shape of a shield skin (56) and arranged against the structural frame (2), said shield (4) including an upper cross member (34) and a lower cross member (36) interconnected via vertical connecting beams (38). The upper (34) and lower (36) cross members and the connecting beams (38) include a plurality of ribs (48) which form cells (50) in the cross members (34, 36) and the beams (38), at least some of said cells (50) passing through the shield (4).

17 Claims, 3 Drawing Sheets

MOTOR VEHICLE FRONT-END PANEL ASSEMBLY COMPRISING A SHIELD

The present invention relates to a motor vehicle front-end panel assembly of the type fixed to side struts and cradle extensions of the motor vehicle chassis, said assembly comprising a plastics material structural frame having at least one lower cross member and vertical struts, each of said struts forming, over at least a portion of its height, a deformable energy absorption component, the assembly further comprising a plastics material shield formed so as to match the shape of a shield skin and arranged against the structural frame, said shield comprising an upper cross member and a lower cross member interconnected via vertical connecting beams.

The present invention also relates to a motor vehicle comprising a shield assembly of this type.

Motor vehicle front-end panel assemblies are provided so as to react sufficiently to different types of impact sustained by the motor vehicle, such as "pedestrian" impacts at approximately 40 km/h, "parking" impacts at approximately 4 km/h (ECE42) and "reparability" impacts at approximately 15 km/h (Danner impacts) whilst reducing production costs.

In order to provide energy absorption, a large number of components are provided in order to react as effectively as possible depending on the type of impact sustained by the vehicle. For example, a shock absorber in the form of a resiliently deformable component is provided for pedestrian impacts and constructed so as to be crushed upon collision with a pedestrian. At least one metal transverse beam is provided for parking impacts, and metal, deformable energy absorption components or "crashboxes" are provided for reparability impacts. This large number of components complicates production of the front-end panel assembly and also adds considerable weight to the motor vehicle, in particular owing to the metal components provided.

One object of the invention is to provide a front-end panel assembly which enables satisfactory shock absorption whilst reducing the number of components, and which can be produced at low cost and reduced weight.

The invention therefore relates to a front-end panel assembly of the aforementioned type, in which the upper and lower cross members and the connecting beams comprise a plurality of ribs which form cells in said cross members and said beams, at least some of said cells passing through the shield.

A front-end panel assembly of this type makes it possible to considerably reduce the number of components forming the module and to forgo a metal transverse beam, reducing the weight of the assembly. In addition, the front-end panel assembly according to the invention makes it possible to react satisfactorily to different types of impact.

In accordance with other aspects of the front-end panel assembly:
- the front-end panel module further comprises two rigid metal plates, of which one face is pressed onto side struts and cradle extensions of the motor vehicle chassis, the vertical struts of the structural frame being arranged against the other face of said plates;
- the shield has at least one portion of which the cross-section decreases in rigidity from its rear face arranged facing the structural frame to its front face;
- the ribs decrease in thickness from the rear face of the portion of decreasing rigidity to the front face of said portion;
- the upper cross member comprises at least one recess which opens onto the front face of the shield, a foam component being received in said recess;
- the front face of the shield is provided with a plurality of fixing means enabling a shield skin and/or motor vehicle accessories to be fixed to said shield;
- the front-end panel assembly comprises a shield skin fixed to the front face of the shield so as to substantially cover said shield;
- the shield skin is formed of a plurality of panels, each fixed to the front face of the shield;
- the shield is formed in one piece; and
- the upper and lower cross members of the shield comprise at least one portion projecting in a forwards direction relative to the vertical connecting beams.

The invention also relates to a motor vehicle comprising a chassis equipped with side struts and cradle extensions, in which a front-end panel assembly as described above is fixed to said side struts and to said cradle extensions.

Other features and advantages of the invention will become clear upon reading the following description, given by way of example and with reference to the accompanying drawings, in which.

Within this description, the terms "longitudinal", "transverse", "front", "rear", "horizontal" and "vertical" are defined in accordance with the conventional directions of an assembled motor vehicle.

Figure 1:
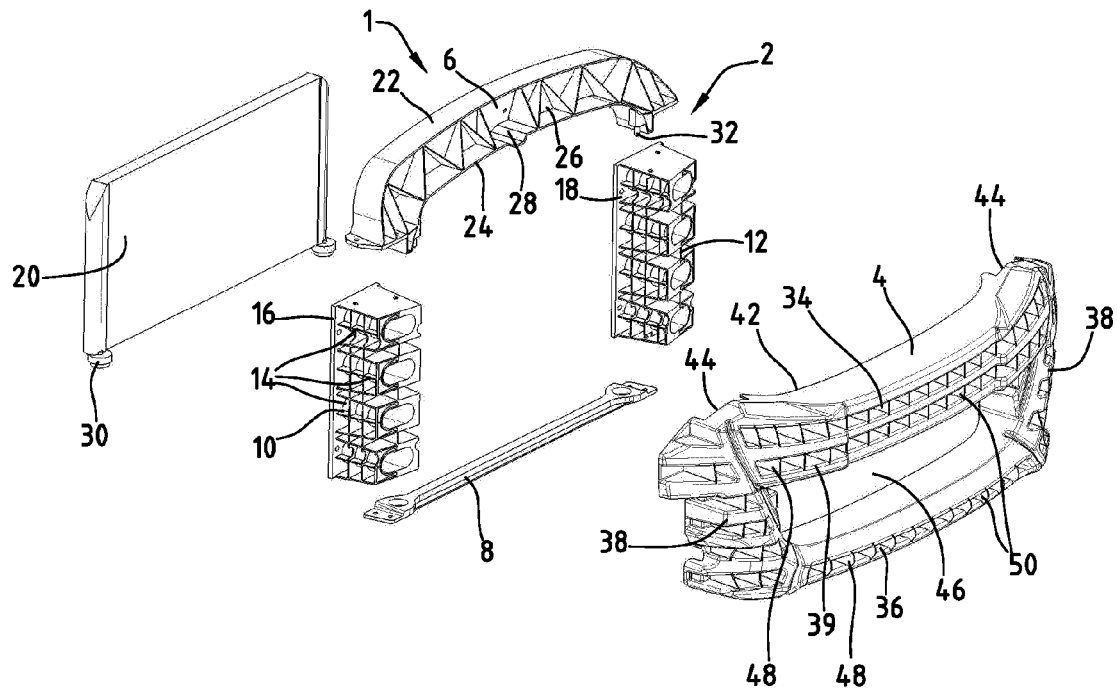
FIG. 1 is a schematic, exploded perspective view of a front-end panel assembly according to the invention.
Figure 2:
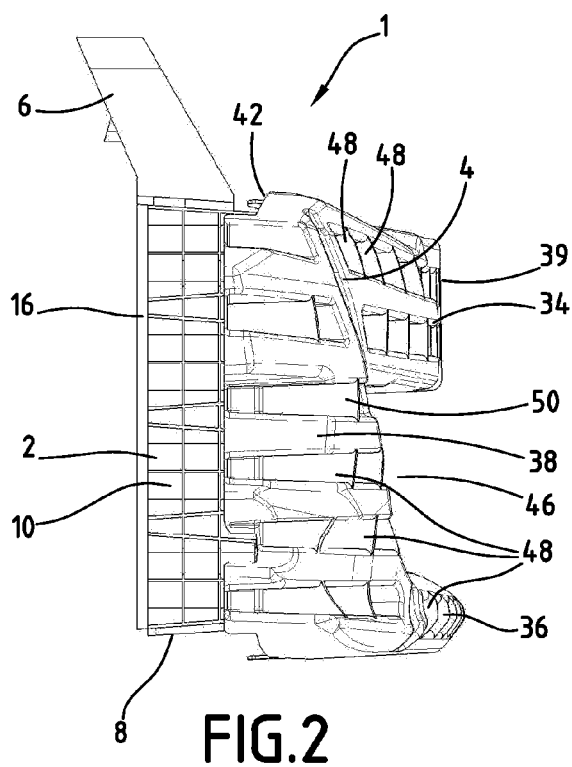
FIG. 2 is a schematic side view of the front-end panel assembly of FIG. 1.

With reference to FIG. 1, a front-end panel assembly 1 basically comprising a structural frame 2 and a shield 4 is described. The front-end panel assembly 1 is fixed to side struts and cradle extensions of the motor vehicle chassis (not shown).

The structural frame 2 contributes to the rigidity of the vehicle body. It comprises an upper cross member 6, a lower cross member 8 and right 10 and left 12 vertical struts.

The right vertical strut 10 and the left vertical strut 12 of the structural frame 2 are each formed by a plurality of deformable components 14. In the embodiment shown, four deformable components 14 are stacked in the vertical direction. In a variant, a vertical strut is formed by a continuous deformable ramp. A component or a deformable ramp is a substantially parallelepiped structure able to absorb some of the energy of an impact by being crushed in a depthwise direction.

The rear face of a vertical strut 10, 14 is pressed onto the most part of the surface of an extended metal plate 16, 18 connecting, on the same side of the vehicle, the ends of a cradle extension arranged at a lower level and of a side strut arranged at a higher level.

The lower cross member 8 of the structural frame 2 connects the two lowermost absorption components 14 of each of the vertical struts 10 and 12. The lower cross member 8 has a generally rectangular cross-section. The central portion of the lower cross member 8 narrows in the vertical direction in such a way that its upper face has a recess for receiving a cooling system, generally denoted by the reference numeral 20. For example, the cooling system 20 comprises an electric fan assembly and a radiator.

The upper cross member 6 of the structural frame 2 connects the two uppermost deformable components 14 of the right 10 and left 12 vertical struts. The upper cross member 6 is generally arc-shaped. As a lattice beam, the upper cross member 6 comprises an upper flange 22 and a lower flange 24 interconnected via reinforcing ribs 26. The reinforcing ribs are arranged so as to form inner triangular compartments. The cross-section of the upper cross member 6 in the median vertical plane is rhombus-shaped with an upper side arranged substantially horizontally and corresponding to the upper flange 22, a lower side corresponding to the lower flange 24, and the front and rear sides inclined upwards and towards the rear of the vehicle. The upper cross member 6 thus extends towards the rear of the vertical plane defined by the lower cross member 8 and the vertical struts 10 and 12.

The upper flange 22 of the upper cross member 6 is adjusted so as to cooperate with a component of the vehicle body and in particular with a bonnet of said vehicle. An inner face of the bonnet oriented towards the inside of the vehicle abuts the upper flange 22, which is shaped for this purpose.

A median portion of the upper cross member 6 has a recess 28 for receiving means for locking the bonnet, which means cooperate with conjugate locking means provided on the bonnet.

Means for retaining the cooling system 20 are provided on the lower flange 24 of the upper cross member 6. In a particularly advantageous embodiment of the front end panel assembly, the lower edge of the cooling system 20 is connected to the lower cross member 8 via fixing tongues 30, whereas the upper edge of the radiator 20 is connected via fixing tongues 32 to the upper cross member 6.

The one-piece structural frame 2 is preferably made of a plastics material, for example by injection of a thermoplastic polymer. The upper 6 and lower 8 cross members and the vertical struts 10 and 12 are formed in one piece. In a variant, the lower cross member 8 and the vertical struts 10 and 12 are formed in one piece so as to form a U-shaped part, and the upper cross member 6 is then fixed, for example by adhesive bonding, to the upper portion of the vertical struts 10, 12. In yet another variant and in accordance with the embodiment shown in FIG. 1, the vertical struts 10, 12 are moulded and then fixed to the lower cross member 8, for example by adhesive bonding, so as to form a U-shaped part, to which the upper cross member 6 may then be fixed.

The shield 4 is arranged against the structural frame 2 towards the front of said frame. For example, said shield 4 is a one-piece component made of plastics material. The shield 4 comprises an upper cross member 34 and a lower cross member 36 interconnected at each of their ends via a substantially vertical connecting beam 38.

The general shape of the shield 4 matches the shape of a shield skin, described below, and fixed to the front face 39 of the shield 4. The shield 4 extends over the entire width of the front-end panel of the motor vehicle, from one wing to the other of said vehicle.

The upper cross member 34 is arranged substantially opposite of the uppermost absorption components 14 of the struts 10 and 12 of the frame 2 and extends between these components 14. The upper cross member 34 further comprises end portions 40 extending beyond the connecting beams 38 on either side of the shield.

The lower cross member 36 is arranged substantially opposite the lowermost absorption components 14 of the struts 10 and 12 of the frame 2 and extends between these components 14.

The rear face 42 of the shield 4 comprises recesses 44 for receiving the struts 10 and 12, the recesses 44 being arranged substantially behind the vertical connecting beams 38.

The upper 34 and lower 36 cross members are outwardly curved in a forwards direction. These cross members 34 and 36 thus have a portion projecting in a forwards direction relative to the connecting beams 38. A central opening 46 is provided between the cross members 34 and 36 and the connecting beams 38 so as to enable air to pass towards the chassis of the motor vehicle.

The upper 34 and lower 36 cross members and the connecting beams 38 each comprise a plurality of ribs 48 arranged so as to form cells 50 extending between the front face 39 and the rear face 42 of the shield 4. At least some of these cells pass through the shield 4 and allow air to pass from the front towards the rear of the shield 4. Cells of this type make it possible to reduce the weight of the shield 4 and to increase its inertia.

In order to improve the properties of the shield 4 under impact, the shield 4 has at least one portion of which the cross-section decreases in rigidity from the rear face of this portion facing the structural frame 2 to the front face of said portion. This portion of shield thus has greater rigidity at its rear side than at its front side.

In a first embodiment, this development of rigidity is obtained by providing ribs 48 which decrease in thickness from the rear towards the front. Since the ribs 48 are thicker towards the rear, the rigidity of the shield is increased, whereas it is reduced in the region where the ribs 48 are thinner.

Figure 4:
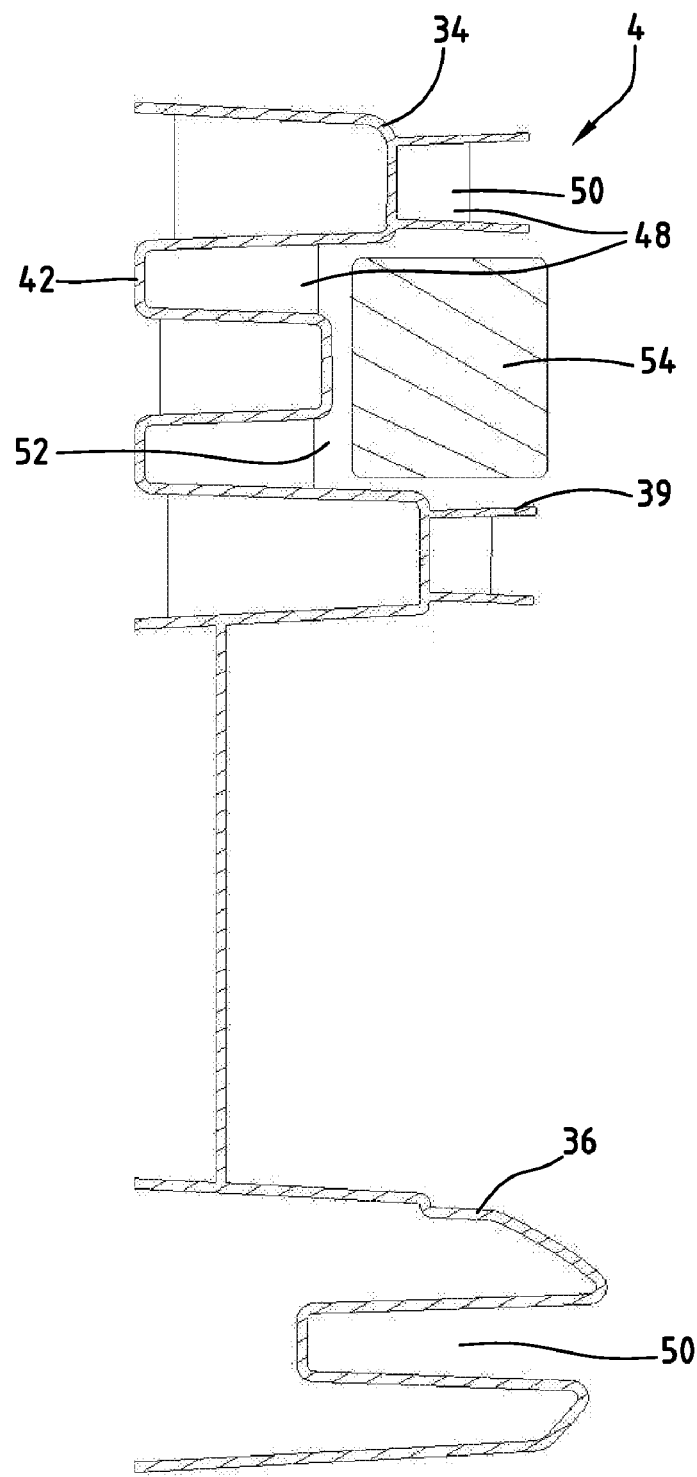
FIG. 4 is a schematic cross-sectional view of a shield of a front-end panel assembly in accordance with one embodiment of the invention.

In another embodiment, the portion of the shield 4 having reducing rigidity comprises a recess 52 for receiving a foam component 54, for example made of expanded polypropylene or the like. For example, said foam component 54 is received in selected cells 50 arranged within the portion of reduced rigidity. In the embodiment shown in FIG. 4, the upper cross member 34 is equipped with a transverse recess 52 receiving a foam component 54. Said recess 52 is open in a forwards direction in such a way that the foam component 54 is arranged directly behind the shield skin.

Figure 3:
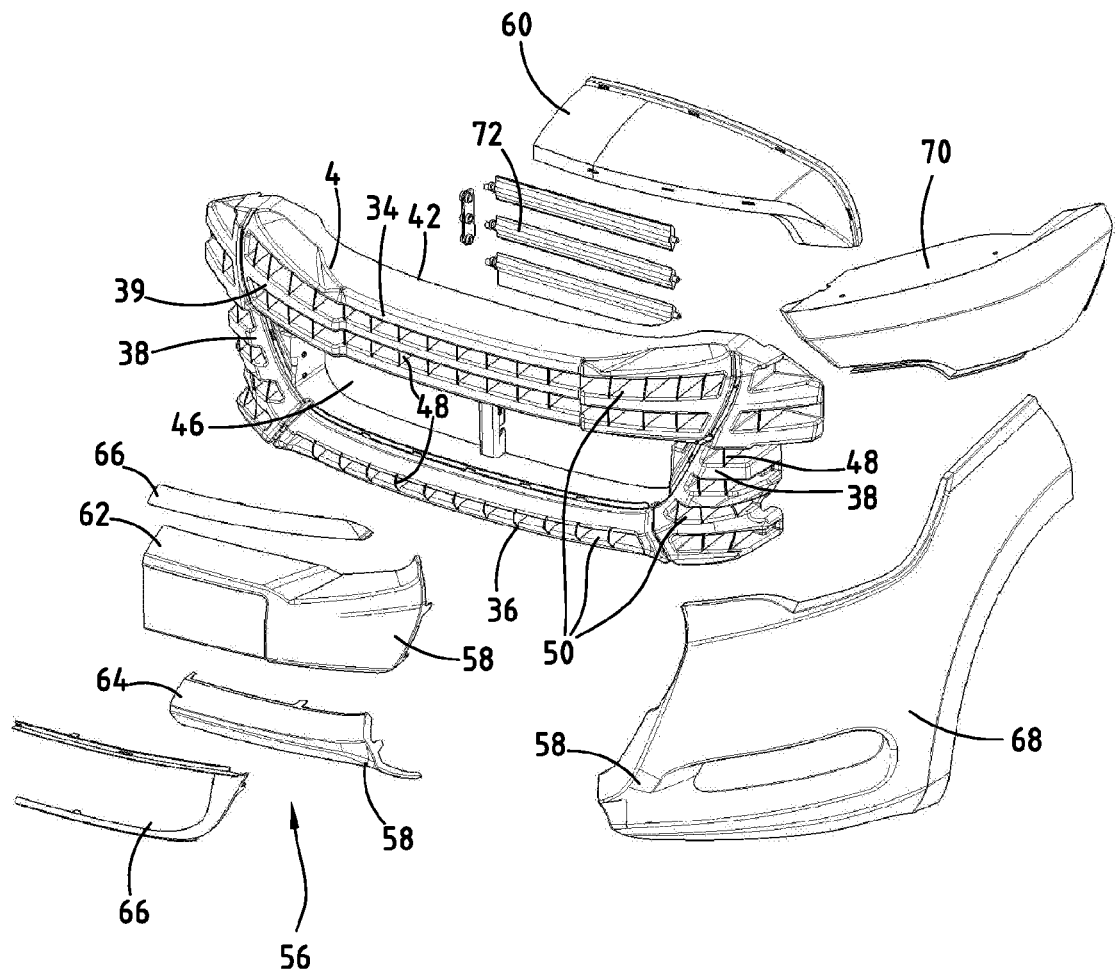
FIG. 3 is a schematic, exploded perspective view of a portion of a front-end panel assembly according to the invention equipped with a shield skin.

A shield skin 56 is fixed to the front face of the shield 4 in such a way that it substantially covers said shield and makes the front of the motor vehicle look attractive. In accordance with the invention, the shield skin 56 is formed of a plurality of panels 58 shaped so as to form the skin 56, as shown in FIG. 3. These panels 58 are thin, for example substantially between 1.5 mm and 3 mm thick, which reduces the weight and bulk of the skin 56. A thickness of this type may be provided since the shield skin 56 does not perform any structural function during the absorption of impacts, this function being performed by the shield 4 and the structural frame 2. The skin 56 thus has a purely aesthetic function, and this makes it possible to reduce its thickness so as to reduce its weight and production cost.

For example, the skin 56 comprises a protective plate 60, an upper protective strip 62, a lower protective strip 64, decorative accessories 66 (for example a chrome-plated trim) and shield corners 68.

The front face of the shield 4 also receives functional accessories of the motor vehicle, such as headlights 70, a ventilation grille (not shown) received in the opening 46 and, optionally, controllable flaps 72 arranged behind the grille which make it possible to guide air in an optimal manner.

In order to ensure that the various components are fixed in place, the front face 39 of the shield 4 is provided with a plurality of fixing means enabling the panels 58 of the shield skin 56 and motor vehicle accessories to be fixed. For example, these fixing means are formed by grooves and orifices for receiving complementary fixing members provided on the panels 58 and on the motor vehicle accessories, which makes it possible to assemble and disassemble panels and accessories as desired. For example, these fixing members are formed in one piece with the panels 58.

The front-end panel assembly described above makes it possible for the motor vehicle to react satisfactorily to impacts whilst reducing the weight of and simplifying this assembly.

In the case of a pedestrian impact, the upper cross member 34 is substantially flexible within its central region owing to its curved shape, and this limits the acceleration peak transferred to the legs of a pedestrian, whilst the wide vertical extension of this cross member 34 reduces flexion at knee level.

In the case of a parking impact, the resilient deformation of the shield 4 dissipates all the energy of the impact with no residual deformation, i.e. the shield maintains its initial shape after impact.

In the case of a reparability (Danner) impact, the deformable energy absorption components 14 absorb the majority of the energy. The shield 4 also assists with this absorption since it deforms resiliently in the case of a Danner impact and actively assists in dissipating energy, in particular via the destruction of its connecting beams 38 and the lateral portions of the upper 34 and lower 36 cross members.

The front-end panel assembly thus makes it possible to react satisfactorily under impact without the need for a metal cross member or metal absorption components, which considerably increase the weight of the assembly.

The shield 4 is particularly easy to produce and does not require a very precise finish since it is covered by a shield skin 56. Savings are thus made when producing the shield 4.

Furthermore, owing to the fact that the skin 56 does not have any structural function, it may be of reduced thickness which makes it lighter and renders it more attractive. Since a plurality of panels 58 are provided, it is possible for the front-end panel to be given the desired appearance by selecting panels based on the driver's wishes. For example, the skin 56 may thus be assembled at the car dealer in accordance with client specifications, which makes it possible to personalise the motor vehicle.

The shield 4 also makes it possible to achieve aeraulic steering and aeraulic sealing relative to the mechanical elements of the vehicle, which in turn reduces drag.

The invention claimed is:

1. A motor vehicle front-end panel assembly (1) of a type fixed to side struts and cradle extensions of a motor vehicle chassis, said assembly comprising:
    a plastics material structural frame (2) having a lower cross member (8), an upper cross member (6), and two vertical struts (10, 12), each of said struts (10, 12) comprising a plurality of deformable energy absorption components (14), said lower cross member (8) connecting lowermost ones of said deformable energy absorption components (14) of each of said two vertical struts (10, 12) and said upper cross member (6) connecting uppermost ones of said deformable energy absorption components (14) of each of said two vertical struts (10, 12); and
    a plastics material shield (4) formed to match a shape of a shield skin (56) and arranged against the structural frame (2), said shield (4) comprising an upper cross member (34) and a lower cross member (36) interconnected via vertical connecting beams (38), each of said vertical connecting beams (38) being in front of respective said deformable energy absorption components (14) of said two vertical struts (10, 12),
    wherein the upper (34) and lower (36) cross members and the connecting beams (38) comprise a plurality of ribs (48) that form cells (50) in said cross members (34, 36) and said beams (38), at least some of said cells (50) passing through the shield (4), and
    wherein the upper cross member (34) comprises at least one recess (52) opening onto a front face (39) of the shield (4), a foam component (54) being received in said recess (52).

2. The front-end panel assembly according to claim 1, further comprising two rigid metal plates (16), a first face of said two rigid metal plates (16) adapted to be pressed onto side struts and cradle extensions of the motor vehicle chassis, the vertical struts (10, 12) of the structural frame (2) being arranged against a second face of said plates (16).

3. The front-end panel assembly according to claim 1, wherein the shield (4) has at least one portion, a cross-section of the at least one portion decreases in rigidity from a rear face arranged facing the structural frame (2) to a front face.

4. The front-end panel assembly according to claim 3, wherein the ribs (48) decrease in thickness from the rear face of the portion decreasing in rigidity to the front face of said portion.

5. The front-end panel assembly according to claim 1, wherein the front face (39) of the shield (4) is equipped with a plurality of fixing means enabling at least one of a shield skin (56) and motor vehicle accessories to be fixed to said shield (4).

6. The front-end panel assembly according to claim 1, further comprising a shield skin (56) fixed to the front face (39) of the shield (4) to substantially cover said shield.

7. The front-end panel assembly according to claim 6, wherein the shield skin (56) is formed of a plurality of panels (58), each fixed to the front face (39) of the shield (4).

8. The front-end panel assembly according to claim 1, wherein the shield (4) is formed in one piece.

9. The front-end panel assembly according to claim 1, wherein the upper (34) and lower (36) cross members of the shield (4) comprise at least one portion projecting in a forwards direction relative to the vertical connecting beams (38).

10. The front-end panel assembly according to claim 2, wherein the shield (4) has at least one portion, a cross-section of the at least one portion decreases in rigidity from a rear face arranged facing the structural frame (2) to a front face.

11. The front-end panel assembly according to claim 2, the front face (39) of the shield (4) is equipped with a plurality of fixing means enabling at least one of a shield skin (56) and motor vehicle accessories to be fixed to said shield (4).

12. The front-end panel assembly according to claim 3, wherein the front face (39) of the shield (4) is equipped with a plurality of fixing means enabling at least one of a shield skin (56) and motor vehicle accessories to be fixed to said shield (4).

13. The front-end panel assembly according to claim 4, wherein the front face (39) of the shield (4) is equipped with a plurality of fixing means enabling at least one of a shield skin (56) and motor vehicle accessories to be fixed to said shield (4).

14. The front-end panel assembly according to claim 2, further comprising a shield skin (56) fixed to the front face (39) of the shield (4) to substantially cover said shield.

15. The front-end panel assembly according to claim 1, wherein a rear face of said shield (4) comprises recesses (44) behind said vertical connecting beams (38) that each receive a respective one of said two vertical struts (10, 12).

16. The front-end panel assembly according to claim 1, wherein said upper cross member (6), said lower cross member (8) and said vertical struts (10, 12) define a central opening that is adapted to receive a cooling system (20).

17. The front-end panel assembly according to claim 16, wherein a lower flange (24) of said upper cross member (6) and an upper face of said lower cross member (8) having fittings for holding the cooling system (20).

* * * * *